United States Patent [19]
Ito

[11] Patent Number: 5,575,246
[45] Date of Patent: Nov. 19, 1996

[54] OPERATIONAL CONTROL DEVICE FOR TWO-CYCLE ENGINES

[75] Inventor: Hideaki Ito, Iwata, Japan

[73] Assignee: Yamaha Hatsudoki Kabushiki Kaisha, Iwata, Japan

[21] Appl. No.: 310,663

[22] Filed: Sep. 22, 1994

[30] Foreign Application Priority Data

Sep. 22, 1993 [JP] Japan .................................. 5-236499
Sep. 22, 1993 [JP] Japan .................................. 5-236500

[51] Int. Cl.⁶ ............................................. F02B 75/02
[52] U.S. Cl. .................................. 123/65 PE; 123/65 V
[58] Field of Search ...................... 123/65 PE, 65 V, 123/65 R, 73 V

[56] References Cited

U.S. PATENT DOCUMENTS

| | | | |
|---|---|---|---|
| 4,541,371 | 9/1985 | Kageyama et al. | 123/65 PE |
| 4,763,613 | 8/1988 | Arahata et al. | 123/65 PE |
| 5,000,131 | 3/1991 | Masuda | 123/65 PE |
| 5,178,104 | 1/1993 | Ito et al. | 123/73 A |
| 5,183,013 | 2/1993 | Ito et al. | 123/65 PE |
| 5,220,890 | 6/1993 | Koriyama | 123/65 PE |

FOREIGN PATENT DOCUMENTS

| | | |
|---|---|---|
| 469596A2 | 2/1992 | European Pat. Off. . |
| 469596A3 | 2/1992 | European Pat. Off. . |
| 603914A1 | 6/1994 | European Pat. Off. . |
| 2234293 | 1/1991 | United Kingdom . |

*Primary Examiner*—David A. Okonsky
*Attorney, Agent, or Firm*—Knobbe, Martens, Olson & Bear

[57] ABSTRACT

A two-cycle crankcase compression diesel engine having a scavenge control system for controlling the amount of scavenging flow and an exhaust control system for controlling the effective compression ratio and the effective flow area of the exhaust system. These controls are operated during normal engine running conditions at most speed ranges from a three dimensional map. However, special control routines and valve operating arrangements are provided for pre-starting, starting, idle, engine braking or deceleration and rapid acceleration so as to improve the running under these transient or non-normal conditions.

106 Claims, 12 Drawing Sheets

OPERATIONAL CONTROL DEVICE FOR TWO-CYCLE ENGINES

BACKGROUND OF THE INVENTION

This invention relates to an operational control for two-cycle engines and more particularly to an operational control for two-cycle, crankcase compression, diesel engines.

In two-cycle, crankcase compression engines, it has been proposed to improve the performance of the engine by providing either scavenge and/or exhaust control. Scavenge control can be provided, as taught in U.S. Pat. No. 5,251,584 entitled two-cycle engine, issued Oct. 12, 1993 in the name of Akihiko Ohkubo and assigned to the assignee hereof. Basically, the way that scavenge control is obtained as shown in that patent is by controlling the pressure in the crankcase chamber during the operation. By changing the crankcase pressure through the scavenge control system, the amount of scavenging air flow in the engine can be controlled. This is particularly important with diesel engines since those engines do not normally employ a throttle valve in the induction system. In that particular patent, the way the pressure in the crankcase chambers is controlled is by communicating several crankcase chambers that are on differences phases of their cycles with each other under certain engine running conditions.

Exhaust control is taught in U.S. Pat. No. 5,000,131 entitled EXHAUST PORT CONTROL VALVE FOR TWO-STROKE ENGINE, issued Mar. 19, 1991 and also assigned to the assignee hereof. With such an arrangement, a valve is positioned in the exhaust porting and by opening and closing the exhaust control valve, the effective compression ratio and/or cross-sectional area of the flow passage of the exhaust system can be controlled.

In the aforenoted scavenge and exhaust controls, the respective scavenge and exhaust control valves are positioned in response to the actual running conditions of the engine. This control may be in response to maps generated from one or more parameters of the engine running condition. Although these devices work extremely effectively and can significantly improve the performance of the engine, there are some running conditions which offer a basis for improvement.

For example, the condition of starting of the engine is one wherein the scavenge control and exhaust control cannot be done by sensing the engine running conditions. Therefore, these control valves might be in a position during starting operation that would inhibit or delay effective starting of the engine.

It is, therefore, a principal object of the invention to provide an improved control for either or both of a scavenge system and exhaust system of a two-cycle crankcase compression engine to provide optimum positions during starting operation.

In connection with these valves and particularly exhaust control valves when the engine is shut off and then restarted, there may be some difficultly in changing the position of the exhaust control valve. The reason for this is that the exhaust control valve obviously will be quite hot when shut down after long periods of engine running, particularly at high speeds and high loads. Any residual oil in the engine and in proximity to the exhaust control valve may carbonize under this condition and cause the valve to stick. Means have been provided for cycling the exhaust control valve at the time of engine shutdown so as to achieve a self-cleaning operation. See for example, co-pending application Ser. No. 08/173,208 entitled EXHAUST CONTROL VALVE FOR ENGINE, filed Dec. 23, 1993 in the names of Tateuyuki Masuda et al and also assigned to the Assignee hereof. However, even though the valve may be cycled at the engine shutdown condition, upon start up there still may be some deposits that have formed after the engine has undergone the cleaning cycle and make it difficult to appropriately position the exhaust control valve.

It is, therefore, a still further object of this invention to provide an improved cleaning procedure for an exhaust control valve initiated before the engine is started.

Another condition when the maps of engine parameters are not completely accurate for setting either or both of the scavenge control and exhaust control valves is during sudden acceleration conditions. Both the exhaust and scavenge control valves are operated by servomotors such as stepper motors and these motors have finite operational speeds. Thus, if the accelerator is depressed more rapidly than the servomotors can operate, the position of the control valve will lag that of the demand of the operator. Thus, if accelerator pedal position is one of the parameters under which the control valves are operated, then the actual position of the control valve will not coincide with that called for by the instantaneous position of the accelerator control. This can result in deteriorated running performance.

It is, therefore, a still further object of this invention to provide an improved control for the scavenge and/or exhaust system of a two-cycle, crankcase compression engine that is controlled under conditions of extreme acceleration.

In addition to the delay in appropriately positioning the scavenge and/or exhaust control valves, the fuel control for the engine also may be disturbed during rapid acceleration. That is, the fuel control will operate more rapidly than the exhaust and scavenge controls and since the fuel control under steady state conditions is determined by the expected positions of the scavenge and/or exhaust control valves, then the amount of fuel supply during sudden acceleration conditions may not be appropriate because of the fact that the scavenge and/or exhaust control valves may not be in their appropriate positions.

It is, therefore, a still further object of this invention to provide an improved fuel control arrangement for an engine having scavenge and/or exhaust controls and which can accommodate rapid acceleration conditions.

Another condition of the engine which does not lend itself to the map type steady state controls is when operating at idle. Small variations in speed at idle can call for more abrupt changes in the scavenge and exhaust control position.

It is, therefore, a still further object of this invention to provide an improved scavenged and/or exhaust control arrangement for an engine during idle mode.

A final condition where the performance of the engine can be improved through the use of the scavenge and/or exhaust controls is during extreme deceleration or engine braking conditions. Under these conditions, the operator demand for speed of the engine is abruptly reduced and the engine is used as a brake for slowing the speed of the object which the engine drives. For example, with automotive vehicles it is desirable to be able to use the engine as a brake during some types of deceleration.

With a diesel engine, the engine braking operation is accomplished by shutting off the flow of fuel to the engine. However, this has certain disadvantages, particularly when the engine is supplied with a catalytic exhaust treatment system. As is well known, catalytic exhaust treatment systems for engines must be at an appropriate operating temperature, which is generally quite a high temperature, to achieve optimum efficiency. However, with a diesel engine undergoing engine braking, the shutoff of fuel to the engine causes the engine to operate as a pump and pump large amounts of unheated or cool atmospheric air into the exhaust system. This can obviously deteriorate the performance of the catalyst, particularly when the engine is returned to normal running and before the catalyst has had an opportunity to return to its operating temperature.

It is, therefore, a still further object of this invention to provide an improved arrangement for engine braking in a two-cycle, crankcase compression diesel engine wherein the amount of air pumped through the exhaust system under engine braking conditions is substantially reduced and the temperature of the air being pumped is increased so as to avoid quenching of the catalyst and exhaust system.

With diesel engines there are also additional considerations of the desirability of reducing the amount of smoke in the exhaust. It has been found that the amount of smoke under a wide variety of running conditions can be controlled appropriately through the use of scavenge and/or exhaust control.

It is, therefore, a still further object of this invention to provide an improved arrangement for controlling the smoke in the exhaust of a diesel engine through control of the scavenge and/or exhaust system.

SUMMARY OF THE INVENTION

The invention is adapted to be embodied in a two-cycle, crankcase compression, internal combustion engine having a scavenging system for transferring a charge from a crankcase of the engine to a combustion chamber thereof. An exhaust system is provided for discharge of the exhaust products from the combustion chamber to the atmosphere. Control means control the flow through at least one of the systems. Sensors are provided for sensing at least two running parameters of the engine. Operating means operate the control means in accordance with a first map in normal steady state conditions within at least a certain speed range and in accordance with another routine in response to another engine condition.

In accordance with a feature of the invention, the other engine condition is starting.

In accordance with another feature of the invention, the other engine condition is idle.

In accordance with another feature of the invention, the other engine condition is a condition of rapid acceleration.

In accordance with a further feature of the invention, the other condition is a deceleration or engine braking condition.

In accordance with a still further feature of the invention, the engine is a diesel engine and the condition is the maintenance of a desired smoke control condition in the exhaust of the engine.

DETAILED DESCRIPTION OF THE PREFERRED EMBODIMENTS OF THE INVENTION

Figure 1:
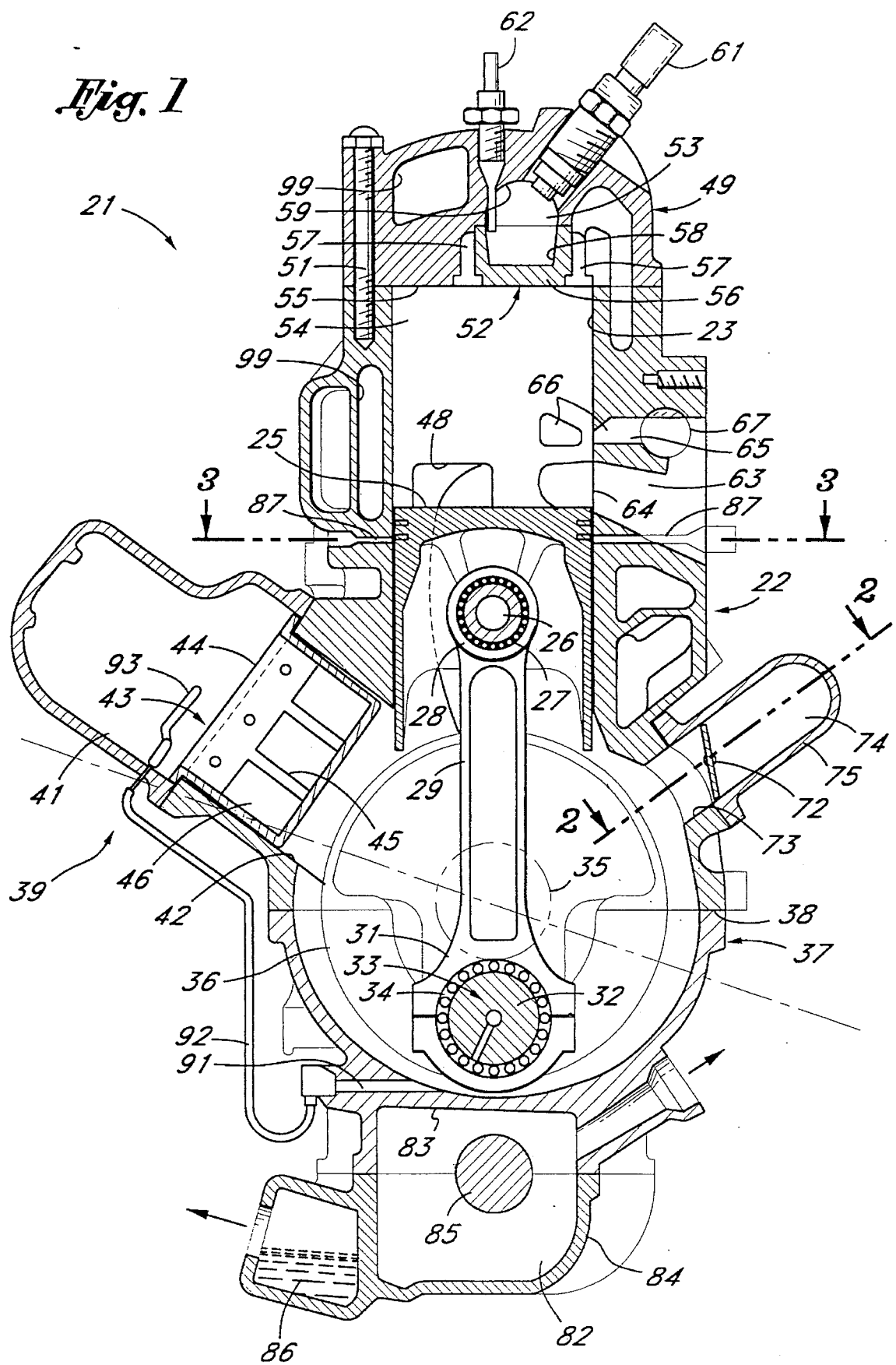
FIG. 1 is a cross-sectional view taken through a single cylinder of a multiple cylinder two-cycle crankcase compression diesel engine.
Figure 2:
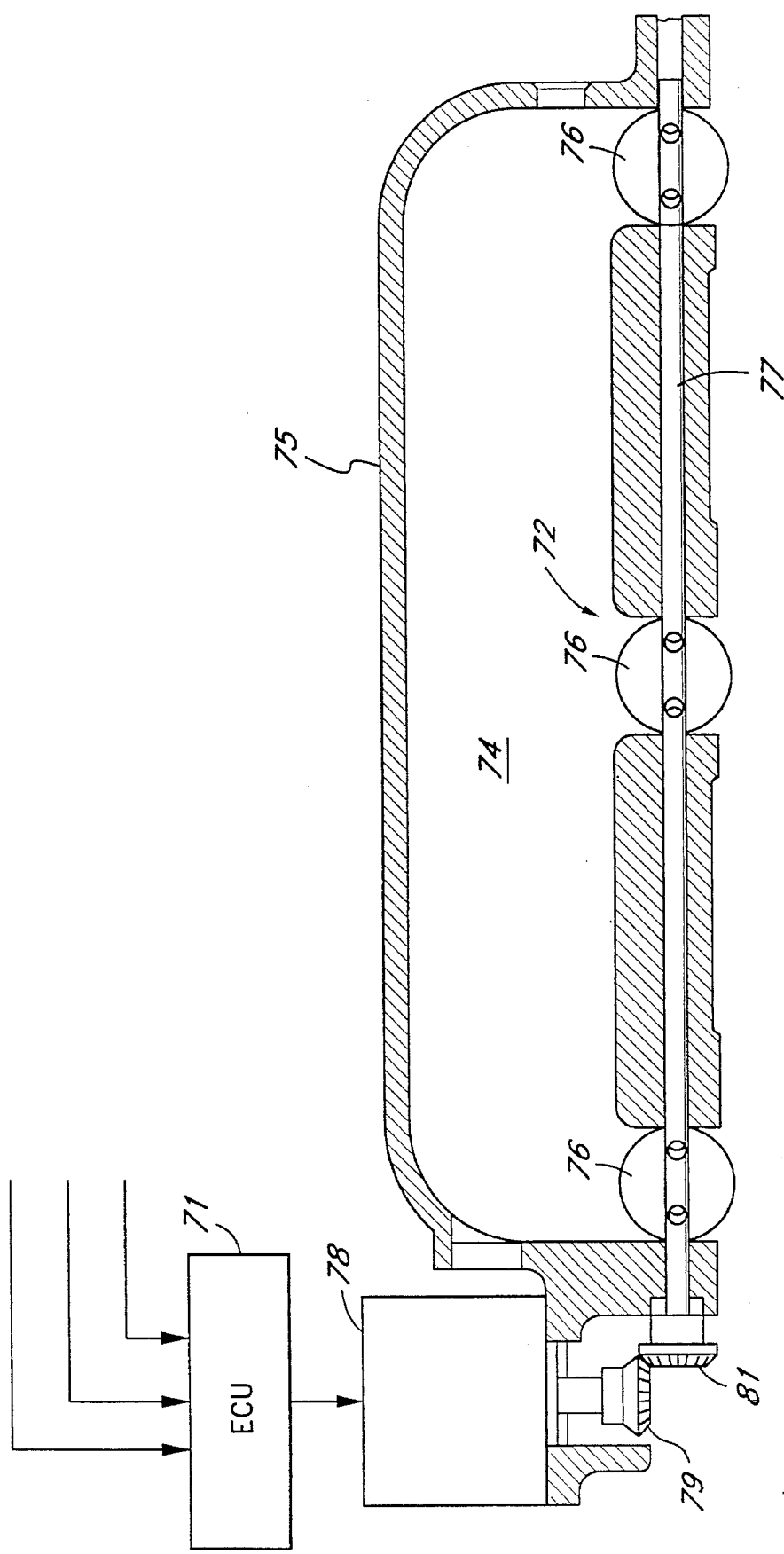
FIG. 2 is a cross-sectional view taken along the line 2—2 of FIG. 1 and shows the scavenge control system
Figure 3:
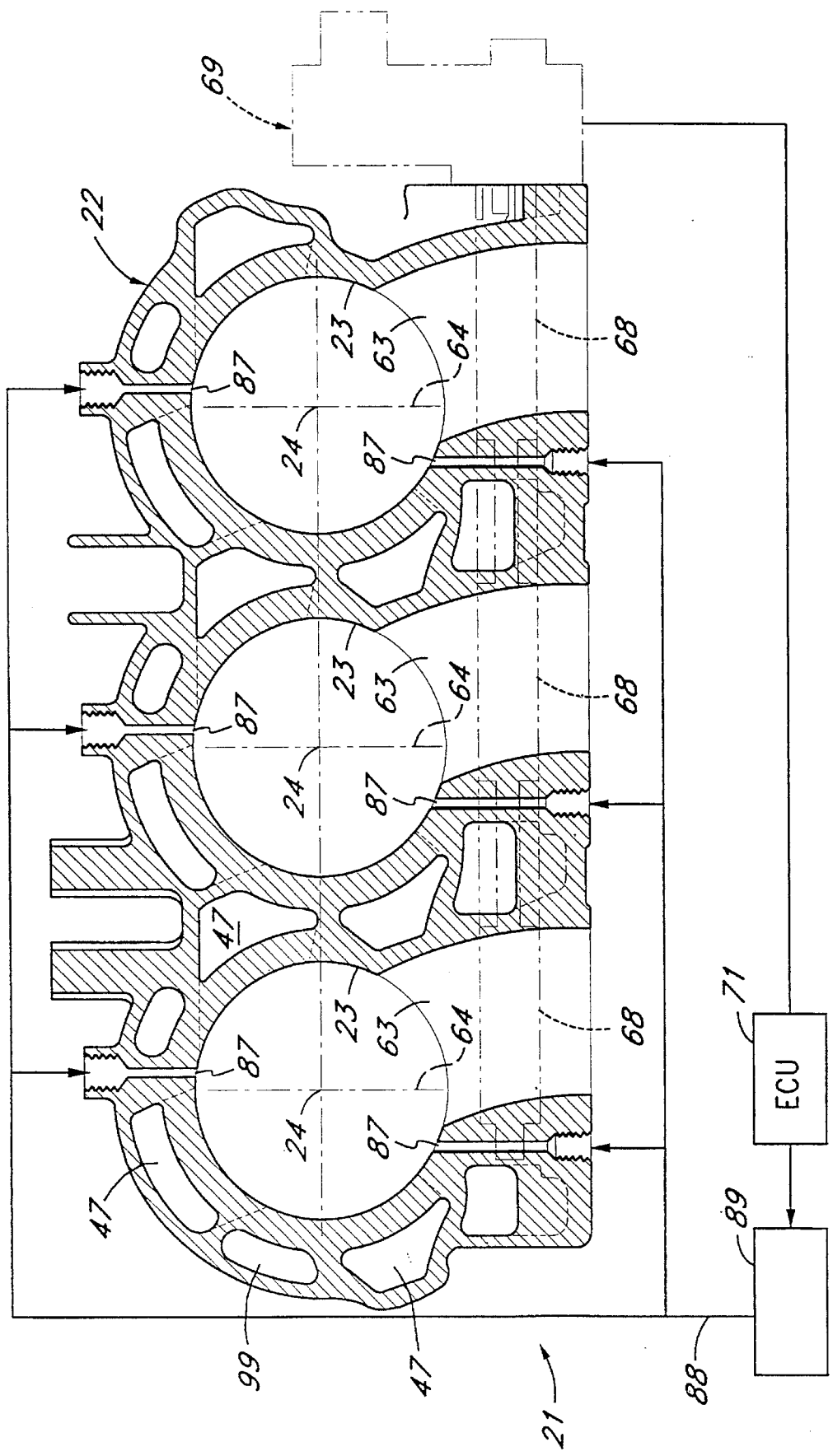
FIG. 3 is a cross-sectional view taken along the line 3—3 of FIG. 1 and shows the exhaust control system in phantom since it does not appear in this particular plane of the drawings.

Referring initially to FIGS. 1–3 and primarily to FIGS. 1 and 3, a crankcase compression, two-cycle, internal combustion engine operating on a diesel principal and incorporating the invention is indicated generally by the reference numeral 21. In the illustrated embodiment, as will become apparent, the engine 21 is of the three-cylinder inline type. It is to be understood that the invention may be practiced with engines having other cylinder numbers and other cylinder configuration and that certain facets of the invention may be also employed with two-cycle engines operating on a spark ignition rather than a diesel principal. However, certain facets of the invention do have particular utility with multiple cylinder engines and diesel engines, as will become readily apparent to those skilled in the art.

The engine 21 includes a cylinder block, indicated generally by the reference numeral 22 that is provided with three cylinder bores 23 that are aligned with each other and which have their axes 24 lying on a common plane as clearly shown in FIG. 3. The cylinder bores 23 may be formed directly from the material of the cylinder block 22 or may be formed by liners that are pressed or cast in place.

Pistons 25 reciprocate in the cylinder bores 23 and have a connection by means of a piston pin 26 and roller or needle bearing 27 to the upper or small end 28 of a connecting rod, indicated generally by the reference numeral 29. The connecting rod 29 has a lower or big end 31 that is journaled on a throw 32 of a crankshaft, indicated generally by the reference numeral 33 by means of roller or needle bearings 34. The crankshaft 33 has main bearing portions 35 that are journaled within a crankcase chamber, indicated by the reference numeral 36 that is formed by a skirt of the cylinder block 22 and a crankcase member 36 that is affixed to the cylinder block skirt at a mating face 37. As is typical with two-cycle crankcase compression engines, the crankcase chamber 36 is divided into separate sealed sections, each associated with a respective one of the cylinder bores 23.

An intake charge of air is drawn into the crankcase chambers 36 by an induction system, indicated generally by the reference numeral 39. This induction system includes an air intake device or plenum chamber 41 that has an atmospheric air inlet (not shown). This inlet device 41 serves a plurality of intake ports 42, one for each cylinder bore 23 and the crankcase chamber 36 thereof. Reed type check valves 43 are positioned in each of the intake ports 42 and are comprised of a caging member 44 having individual openings 45 that are valved by reed-type valve elements 46. The reed-type valve 43 permits an intake charge to be drawn into the crankcase chambers 36 when the pistons 25 are moving upwardly and to preclude reverse flow as the pistons 25 move downwardly to compress the charge in the crankcase chambers 36.

The charge which has been compressed in the crankcase chambers 36 is transferred to the area in the cylinder bores 23 above the pistons 25 through a plurality of scavenge passages 47 that are formed around the periphery of the cylinder bore 23 and which terminate in scavenge ports 48 that are opened and closed by the reciprocation of the piston 25 as is well known in this art.

A cylinder head assembly, indicated by generally by the reference numeral 49 is affixed to the cylinder block 22 inclosing relationship with the cylinder bores 23 by means including threaded fasteners 51. The cylinder head assembly 49 is provided with an insert piece 52 for each cylinder bore, which insert piece defines a pre or torch chamber 53. This torch chamber communicates with a main combustion chamber 54 formed by a lower surface 55 of the cylinder head assembly 49, the cylinder bores 23 and the heads of the pistons 25 through a restricted throat 56.

An air gap 57 is formed around the insert piece 52 so as to provide heat insulation therearound and to insure that the insert piece 52 will be maintained at an elevated temperature. The pre-chamber 53 is formed by an internal cavity 58 in the insert piece 52 and a corresponding cavity 59 formed in the cylinder head assembly 49.

A fuel injector 61 is mounted in the cylinder head assembly and sprays fuel into the prechamber cavity 53 and through the throat 56 into the main combustion chamber 54. A glow plug 62 may be mounted in the cylinder head assembly 49 so as to assist in ignition and particularly during cold starting.

As is well known in this art, the injector 61 is actuated so as to inject fuel at a time when the charge in the prechamber 53 is highly compressed so that the charge will immediately ignite and expand into the main combustion chamber 54 through the throat 56. This expansion drives the piston 25 downwardly in a well known manner.

A main exhaust passage 63 extends through the side of the cylinder bore 23 opposite the center of the scavenge ports 48 and is rotated slightly from a plane 64 that contains the cylinder bore axes 24 and which is perpendicular to the common plane of the cylinder bore axes 24 as shown in FIG. 3. The main exhaust passage 63 terminates in an exhaust port 64 so as to achieve a Schnurl type scavenging for the engine.

In accordance with a feature of the invention, an auxiliary exhaust passage 65 extending from auxiliary ports 66 positioned above the main exhaust passage 63 merges into the main exhaust passage 63 so that the exhaust gases can be discharged through a common exhaust manifold (not shown) and exhaust system. In order to treat the exhaust gas products, a catalyst bed may be positioned in this exhaust system.

An exhaust control valve 67 is supported in the auxiliary exhaust passage 65 and has individual valving sections 68 shown in phantom in FIG. 3 that control the opening and closing of the auxiliary exhaust ports 66 in a manner which will be described. The structure of the control valve 67 and its valuing portion 68 may be of the type described in the aforenoted U.S. Pat. No. 5,000,131, the disclosure of which is incorporated herein by reference. Basically, the exhaust control valve 67 is operatively connected to a servomotor 69 that is mounted at one end of the cylinder block 22 and which is actuated by an ECU 71 in accordance with a control routine as will be described.

It should be noted that the auxiliary exhaust passages 66 will open earlier and close later on reciprocation of the piston 25. Also, the opening of the exhaust control valve portion 68 will change the effective flow area of the exhaust system. By changing the timing, the effective compression ratio of the engine can be increased. That is, when the exhaust control valve 67 is closed the compression ratio will be higher and the exhaust port opening area smaller. This is utilized for a propose which will be described.

In addition to the exhaust control valve 67, there is also provided a scavenge control system and this is illustrated in FIGS. 1 and 2. The scavenge control system includes a scavenge control valve assembly 72 which controls the communication of a plurality of scavenge control ports 73 with an interconnecting conduit 74 formed by a member 75 that is affixed to the skirt portion of the cylinder block 22. The valve assembly 72 includes a plurality of butterfly type control valves 76 affixed to a common shaft 77 and operated by a stepper motor 78 through a pair of double gears 79 and 81. This system is basically as described in FIGS. 14 and 15 of aforenoted U.S. Pat. No. 5,251,584, the disclosure of which is incorporated herein by reference.

Basically, the scavenge control valve assembly 72 operates so as to permit normal maximum scavenging when the control valve elements 76 are closed. However, when these valves 76 are opened, then each crankcase chamber 36 will communicate with the others. Since the pistons 25 do not all fire at the same time but rather fire sequentially, the opening of the control valve 76 will effect the pressure in the crankcase chambers 36 and increase their effective volume to reduce the total amount of scavenging flow. This is important in view of the fact that the engine, being a diesel engine, has no flow controlling throttle valve in the induction system 39. The stepping motor 78 is also operated by the ECU 71 in a manner which will be described later.

To complete the description of the details of the engine 21, there is provided a balance shaft chamber, indicated generally by the reference numeral 82 that is formed by a recess 83 in the lower wall of the crankcase forming member 37 and a cover plate 84 affixed thereto. A balance shaft 85 is journaled within the balance shaft chamber 82 and is driven at crankshaft speed but in an opposite direction through a gear train, for example that shown in copending application Ser. No. 08/276,953, filed Jul. 19, 1994, in the names of Tatsuyuki Madusa, and assigned to the Assignee hereof, the disclosure of which is also incorporated herein by reference. A lubricating oil reservoir 86 is formed to one side of the balance shaft chamber 82 and contains lubricant for lubricating certain components of the engine, as will be described.

The engine 21 may be provided with a lubricating and ventilating system as described in the aforenoted patent applications and this lubricating system includes a number of direct cylinder lubrication ports 87 that are formed in the cylinder block 22 (FIGS. 1 and 3) and which receive lubricant from a supply conduit 88 under the operation of a lubricant pump 89 that is powered and controlled by the ECU 71 as described in the aforenoted copending application.

The lubrication system for the engine will result in some lubricant collecting in the bottom of the crankcase chambers 36 and this lubricant is drawn through a drain passage 91 to a conduit 92. The conduit 92 extends into the induction system plenum chamber 41 and has nozzle portions 93 disposed on the upspring side of the check valve 43 so that the lubricant will not accumulate in the crankcase chambers but will be circulated through the engine while it runs to insure adequate lubrication and good exhaust emission control.

The construction of the engine 21 as thus far described may be considered to be conventional and where any details of the engine have not been illustrated or described, reference may be had to any of the known prior art type of construction.

Figure 4:
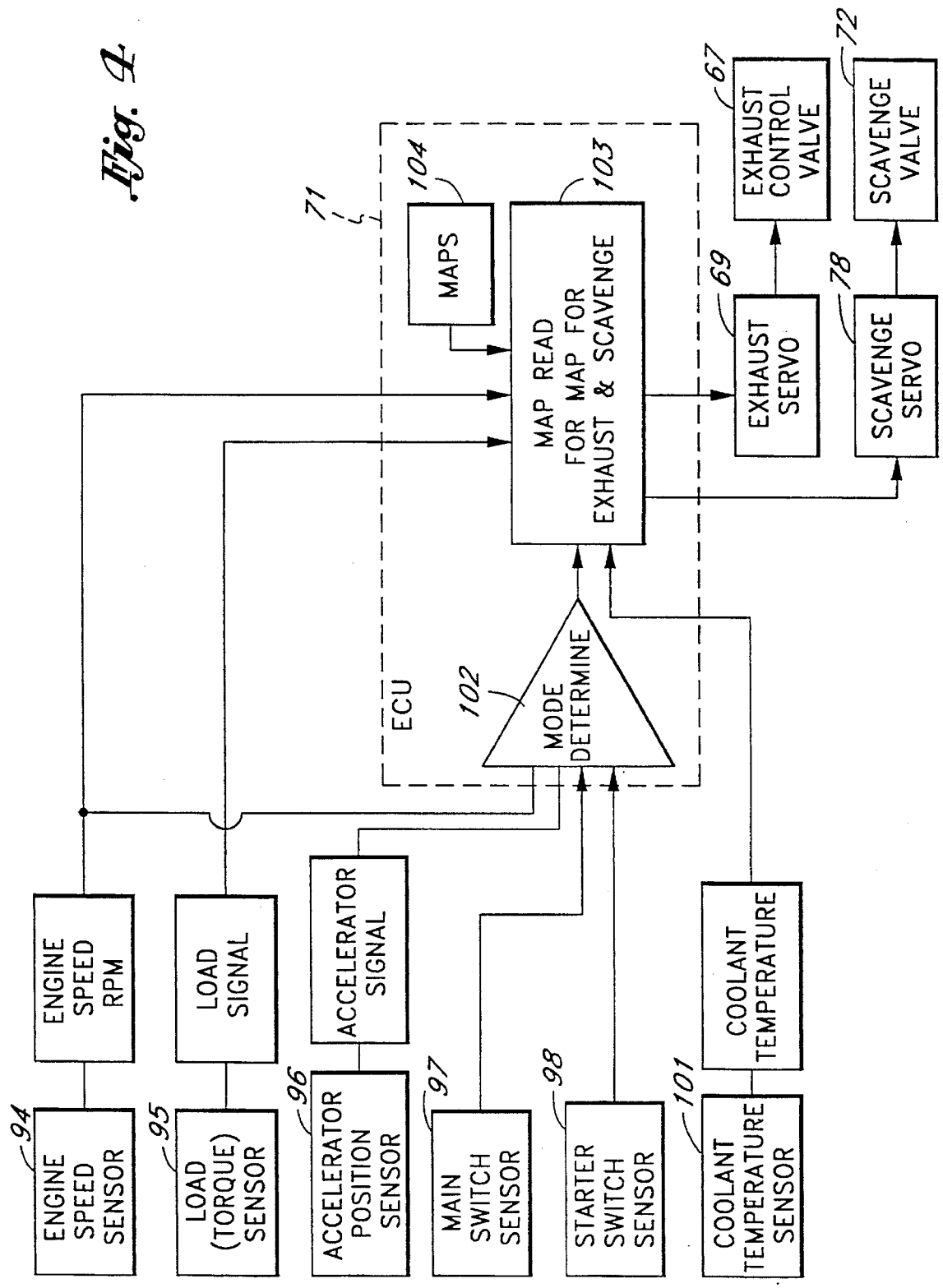
FIG. 4 is a block diagram showing the components of the system along with the mode determination and control arrangement.

The operation of the exhaust control valve 67 and scavenge control valve 72 will now be described by particular reference to the remaining figures. FIG. 4 describes in generally schematic form the various components for the control including disclosure of certain sensors associated therewith. The sensors include an engine speed sensor 94 which can conveniently be of a type that cooperates with the crankshaft 33 so as to provide an output signal indicative of the engine speed in RPM. In addition, an engine load sensor 95 is provided that senses the actual load on the engine. This may be determined in any of a variety of manners, for example, by using a torque sensor or by merely measuring the actual fuel consumption of the engine.

The engine 21 is provided with an operator accelerator control (not shown), the position of which is indicated by an accelerator position sensor 96.

The system is also provided with an electrical system including a main switch and a sensor 97 is provided that determines the position of the main switch. In a preferred arrangement, the main switch is of a type that is normally employed in automotive vehicles and includes an off position, an accessory position, an on position and a start position.

There is also provided an electric starter for the engine 21 which is not shown but which may be of any known type and which cooperates with a flywheel attached to the crankshaft 33 for starting of the engine in a well known manner. A switch 98 is indicative of when the starter motor is being operated and switched on or off. As has been previously noted, the main switch 97 has a start position wherein the starter motor is energized.

In the illustrated embodiment, the engine 21 is water cooled and portions of its cooling jacket appear in FIGS. 1 and 3 and are identified by the reference numeral 99. The engine coolant temperature is sensed by a coolant temperature sensor 101 and that outputs a coolant temperature signal.

Continuing to refer to FIG. 4, the ECU is shown partially and includes a mode detector, indicated generally by the reference numeral 102 that receives the engine speed, accelerator position, main switch position and starter switch condition signals so as to determine the mode of operation of the engine. As will become apparent, the modes chosen in connection with the control routine are a pre-start mode before the engine starter is energized (main switch in accessory position), a starting mode when the starter motor is energized, and an idle mode once the engine starts and begins to run on its own, a normal running condition, a rapid acceleration condition and a deceleration or engine braking condition. The manner in which these conditions are determined will be described later.

Once the mode is determined, this is outputted to a section 103 which makes the actual readings for the desired or optimum positions of the exhaust control valve 67 and the scavenge control valve 72. This information is derived by selecting one of a plurality of pre-memorized two or three dimensional maps 104 to output control signals to the exhaust servo 69 and scavenge control servo 78 to control the exhaust control valve 67 and scavenge control valve 72 into their desired positions.

Figure 5:
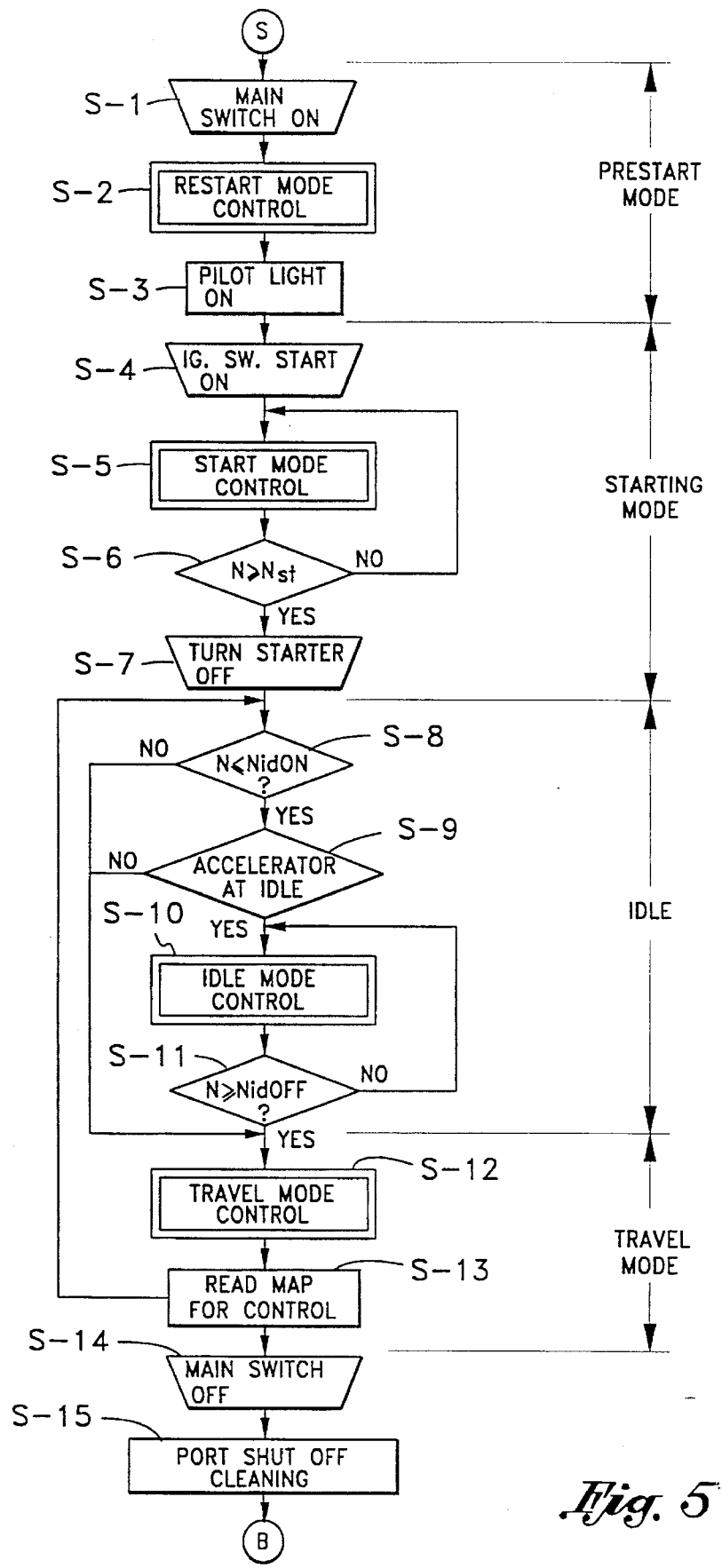
FIG. 5 is a block diagram of the control routine for the exhaust control valve in the modes of pre-start, during start, during idle, during normal running and at shut off.
Figure 6:
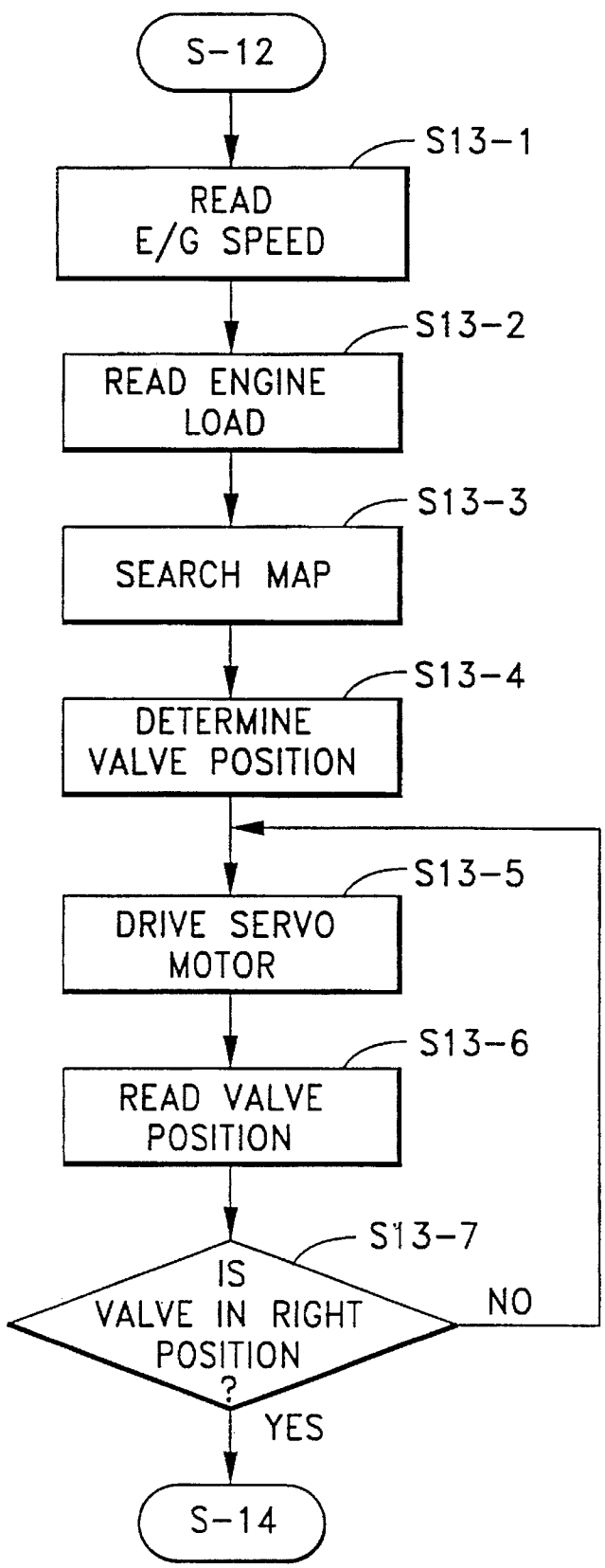
FIG. 6 is a block diagram showing the sub-control routine for operating the exhaust control valve during the three-dimensional control phase.
Figure 7:
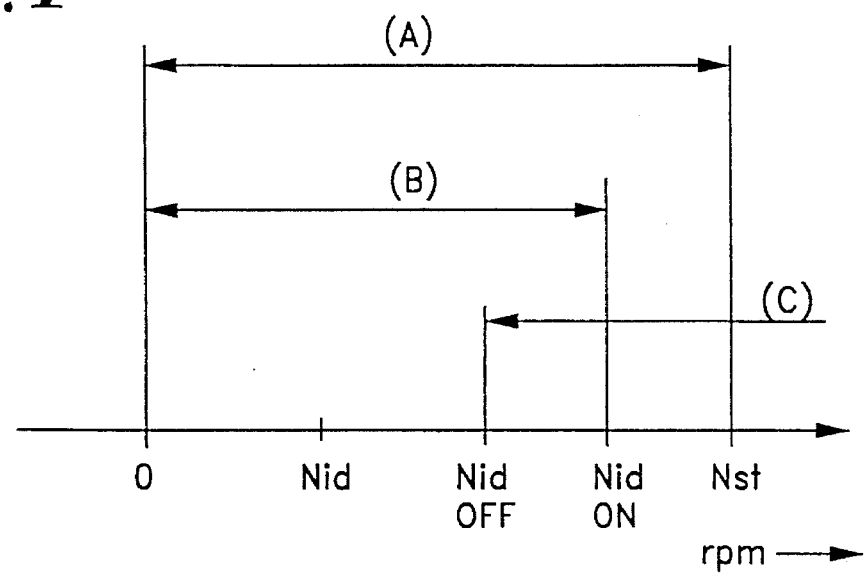
FIG. 7 is a block diagram explaining the control routine of the exhaust control valve during start up and idle.
Figure 8:
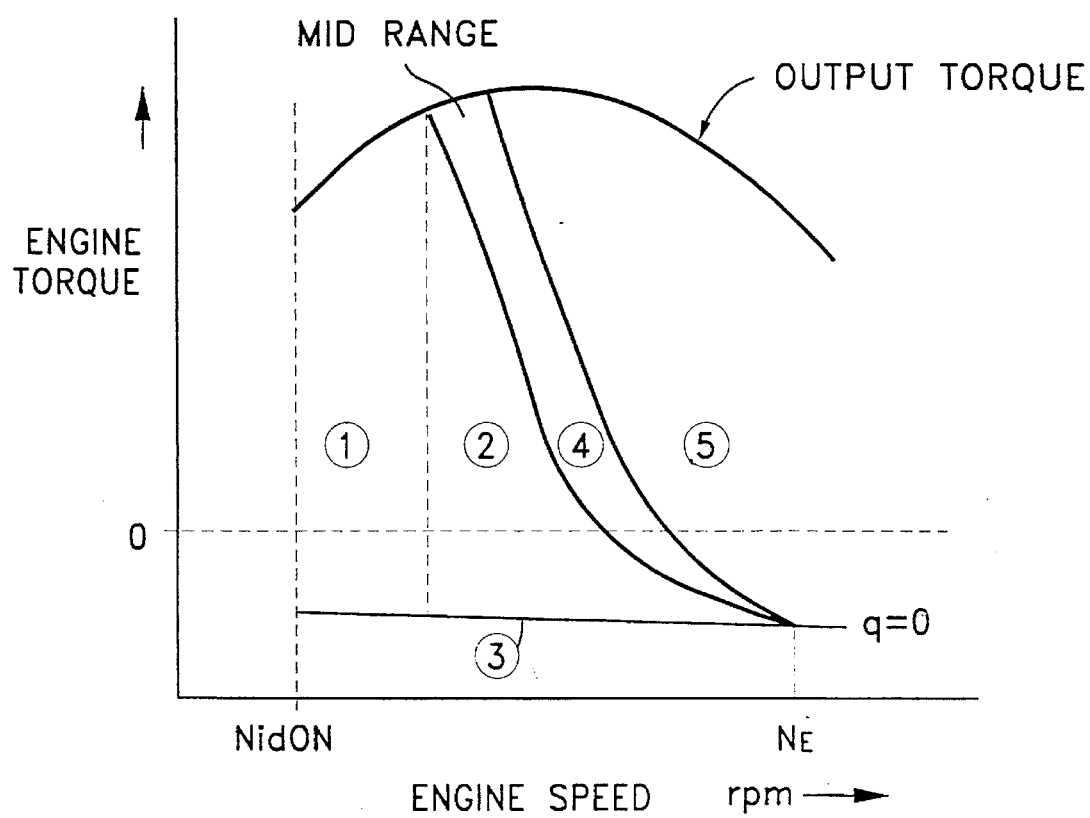
FIG. 8 is a graphical view showing the control routine of the exhaust valve in response to engine speed and engine torque and shows the various control modes.
Figure 9:
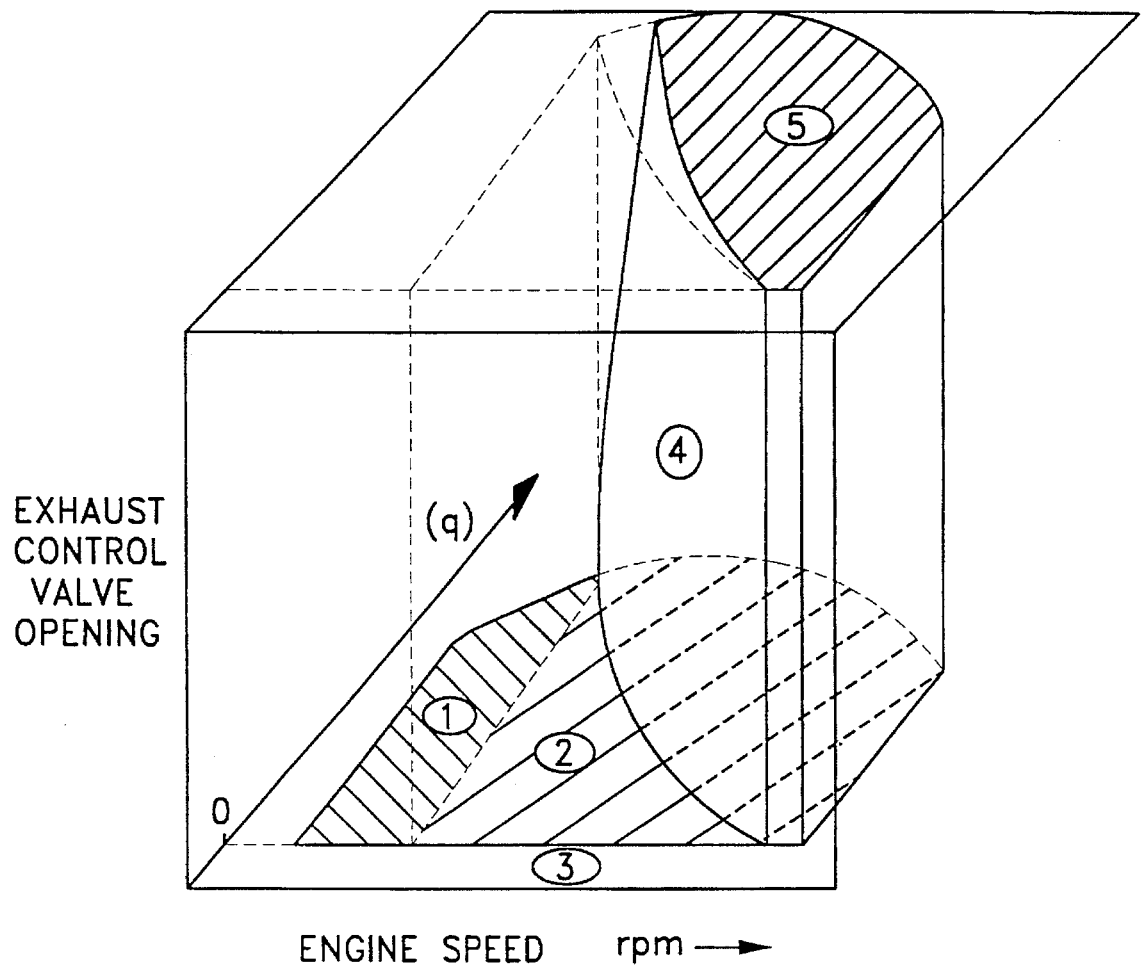
FIG. 9 is a three-dimensional map showing how the position of the exhaust control valve is determined under all conditions of engine speed and engine torque or fuel injection amount q.

The various control modes for the exhaust control valve 67 will now be descried by particular reference to FIGS. 5–9. FIGS. 5 and 6 show the control routine while FIG. 7 indicates the determination of the engine idle condition and FIG. 8 and 9 show graphically the maps and the various control routines which will be pointed out specifically by reference to FIG. 5.

In FIG. 5, the program begins at the step S1 when the main switch is turned on first to its accessory position. The program then moves to the step S2 to initiate the prestart mode of control for the exhaust control valve 68. This pre-start mode operates first to cycle the exhaust control valve 67 through one or more complete open and close cycles ending at a closing cycle by actuating the servomotor 69. This is done so as to insure that the exhaust control valve 67 is free for operation. After the cleaning cycle has been completed, the exhaust control valve is then moved to the fully closed position so as to provide maximum compression ratio to assist in starting.

Once the exhaust control valve is determined to be in its closed position by sensing the position of the servomotor 69, then a pilot light is switched on at the step S3 so as to notify the operator that the pre-start mode has been completed.

The operator then at the step S4 moves the main switch to the start condition and the program moves to the step S5 so as to begin the start mode control by permitting energization of the starter motor. Under this time, the exhaust control valve 67 is still maintained at its closed position.

The program then moves to the step S6 so as to determine if the engine has started. This is done by comparing the instantaneous engine speed and with a speed $N_{st}$ which speed is higher than the speed the engine rotates when the starter is operating, this starter speed being approximately 450 RPM. During this time, the exhaust control valve 67 is still maintained in its closed position and as long as the engine speed is not equal to or greater than the speed $N_{ot}$, the program continues to repeat back to the step S5. If, however, at the step S6 it is determined that the engine speed is above that of the speed $N_{st}$, then the program moves to the step S7 so as to turn the starter motor off. This completes the operation of the starting mode and the program then moves to the idle mode condition.

There is provided an idle speed sensor switch that has a range of Nid-OFF and Nid-ON that indicates that the engine is at an idle speed range and it is confirmed at the step S8 that the speed N is equal to or below Nid-ON. If it is not, the program jumps ahead. If, however, the engine speed is below or equal to the speed Nid-ON, the program moves to the step S9 so as to read the position of the accelerator position sensor 96 to confirm that it is in the idle mode. If it is not, the program jumps ahead to the travel mode as will be noted.

If, however, it is determined in the step S9 that the engine is in fact in the idle condition, then the program moves to the step S10 so as to begin the idle mode control. Basically this control eliminates any map and just maintains the servomotor 69 and exhaust control valve 67 in its fully closed position so as to maintain the high compression ratio under idle condition.

It is again confirmed then at the step S11 whether the engine speed N is greater than or equal to Nid-OFF condition which is a slightly lower speed than Nid-ON condition. Assuming the engine speed still is below Nid-OFF, the program repeats. If, however, the engine speed N has exceed Nid-OFF speed, then the program moves into the running or travel mode shown in FIG. 5.

If the engine speed is indicative of the travel mode, then the program moves to the step S12 so as to initiate the travel mode control and proceeds to the step S13 so as to read the three dimensional map so as to control the exhaust control valve 67 in response to engine characteristics in accordance with a routine which will be described by reference to FIG. 6 which is actually a sub-part of the control routine S13 and thus has been identified by suffix numbers based upon S13. Under this control mode, the exhaust control valve 67 and servomotor 69 are controlled by the maps in accordance with the routine shown in FIGS. 8 and 9.

The sub-control routine of FIG. 6 includes the first step S13-1 of reading the engine speed from the engine speed sensor 94, reading the engine load at the step S13-2 by the engine load sensor 95 and moving to the step S13-3 to read the three dimensional map of FIG. 9. In the control routine described, the position of the exhaust control valve is determined by engine speed and engine load and the map of FIG. 9 shows engine load as determined by the fuel injection amount per cycle q. This three dimensional map has a number of ranges indicated as ①, ②, ③, ④, and ⑤ with the range ① representing a low engine speed in the vicinity of or slightly above Nid-ON RPM range. In this operation, the exhaust control valve 67 is maintained in its closed position regardless of the amount of fuel injected (load). In this way the pressure wave from the exhaust gases can be utilized to improve filling efficiency increasing the output by the amount needed to inhibit the generation of smoke. Since the compression ratio can be increased, combustion properties are improved making it possible to lower hydrocarbon emissions and improve fuel economy.

The control phases 2, 4 and 5 indicate low, medium and high engine speeds and during this range the greater the speed, the more the exhaust control valve 67 is opened. Under these conditions, as the load and fuel injection amount increase, then the more the exhaust control valve 67 is opened. In the high load condition even if the engine speed may be relatively low the exhaust control valve 67 is maintained in its open condition so as to reduce the loading on the engine.

Once the appropriate valve position has been determined from the three dimensional map of FIG. 9 at the step S13-4, the servomotor 69 is energized at the step S13-5 so as to operate the servomotor in the appropriate direction. The position of the exhaust control valve 67 is then continuously read at the step S13-6 and a feedback control is applied at the step S13-7. Thus, when the appropriate position of the exhaust control valve is reached, the servomotor 69 is switched off but until then the program continues to repeat back through the steps S13-5,-6 and -7.

There is one additional control mode other than a steady state condition and this is the engine braking mode which is indicated at ③ in FIG. 8 and 9. Under this condition, fuel is supplied, q is shut off (q=0) and the exhaust control valve is positioned in its fully closed position so as to reduce the amount of flow through the exhaust system to avoid quenching of the catalyst and also reduce the flow passage affective area for the same purpose. This engine braking operation will be described later.

The final control for the exhaust control valve 67 now will be described again by reference to FIG. 5 and this is the condition when the main switch is shut off at the step S14. When this is done, then a post shut off cleaning of the exhaust control valve 67 is accomplished by operating the servomotor 69 through several cycles of operation so as to clean any deposits off of the exhaust control valve 67 so that they will not turn to carbon or sludge and cause sticking of the exhaust control valve. This routine may be as set forth in the copending application Ser. No. 173,208 filed Dec. 23, 1993 in the name of T. Masuda and assigned to the Assignee hereof.

Figure 10:
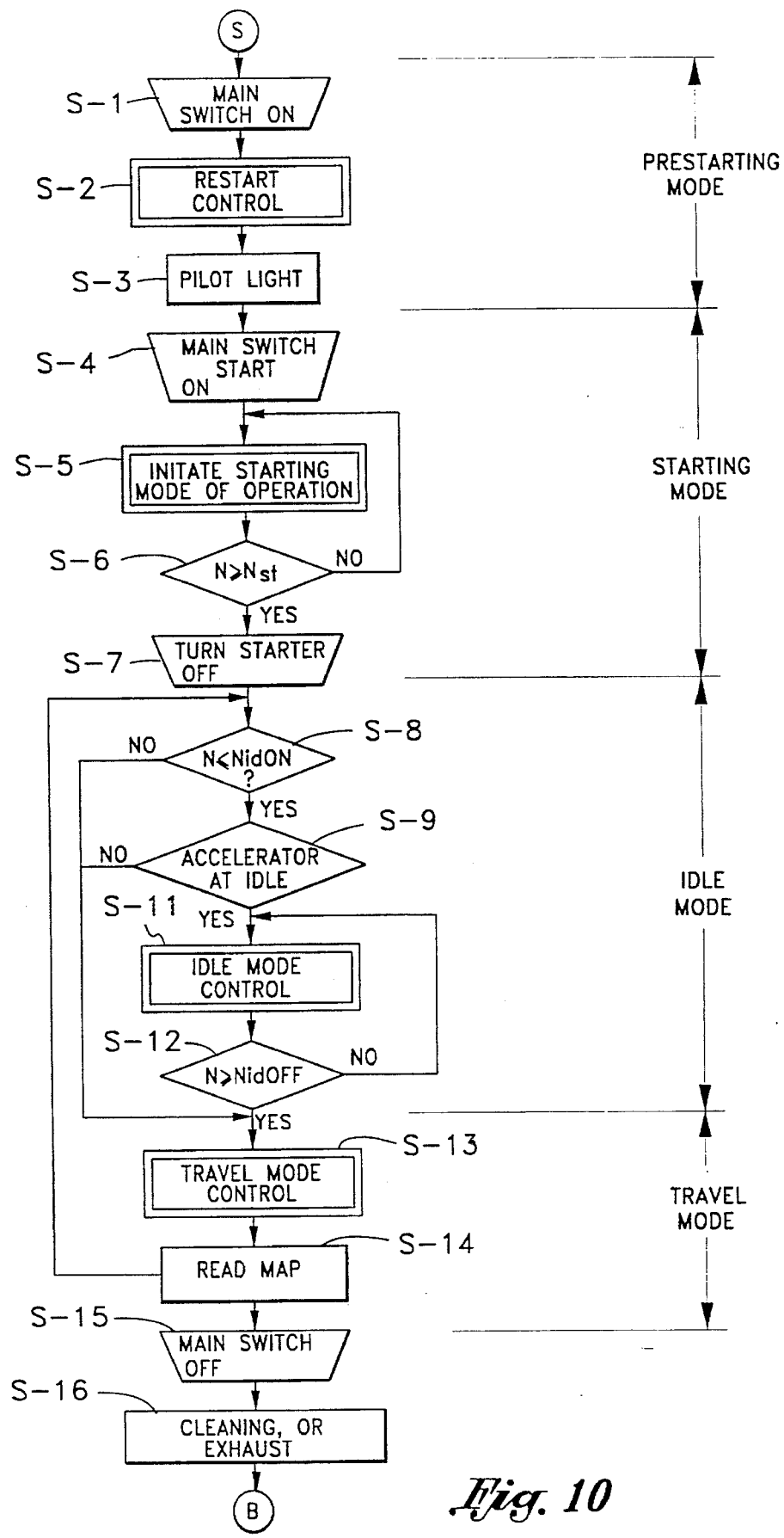
FIG. 10 is a block diagram, in part similar to FIG. 5 and shows the control routine for the scavenge control valve during pre-start, engine starting, engine idle and engine driving and engine shutoff.
Figure 11:
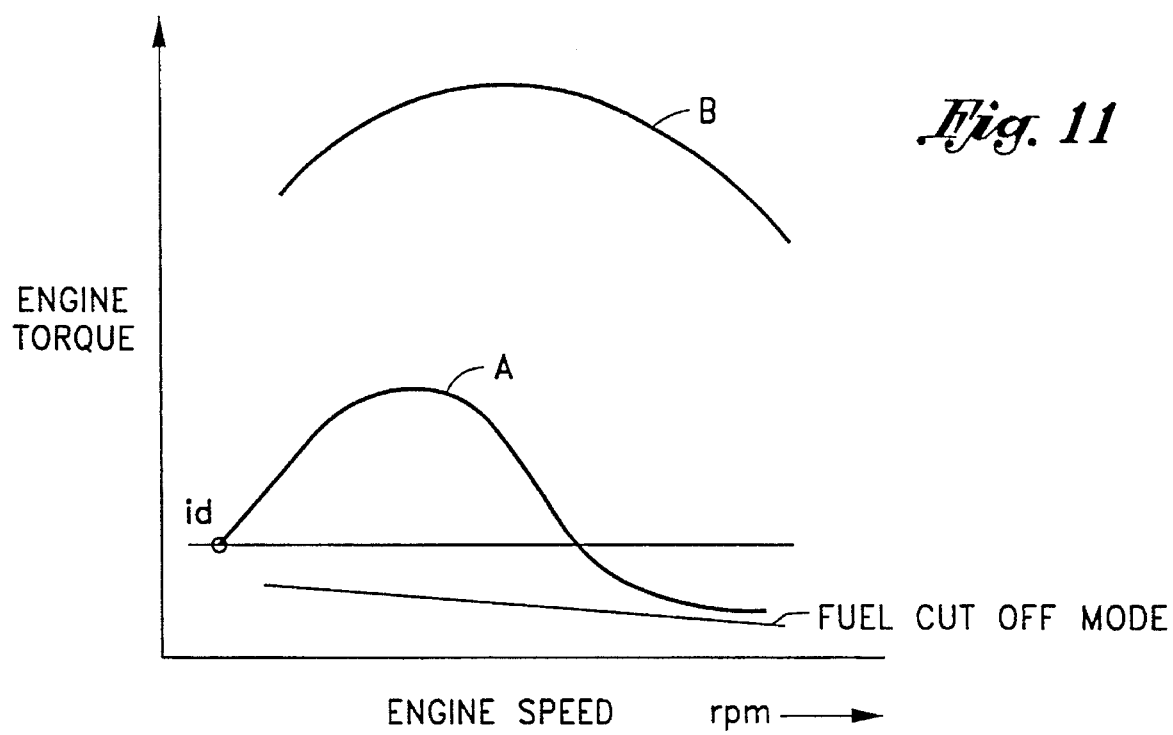
FIG. 11 is a graphically view, in part similar to FIG. 8 and shows the control routine of the scavenge control valve in response to engine speed and engine torque.
Figure 12:
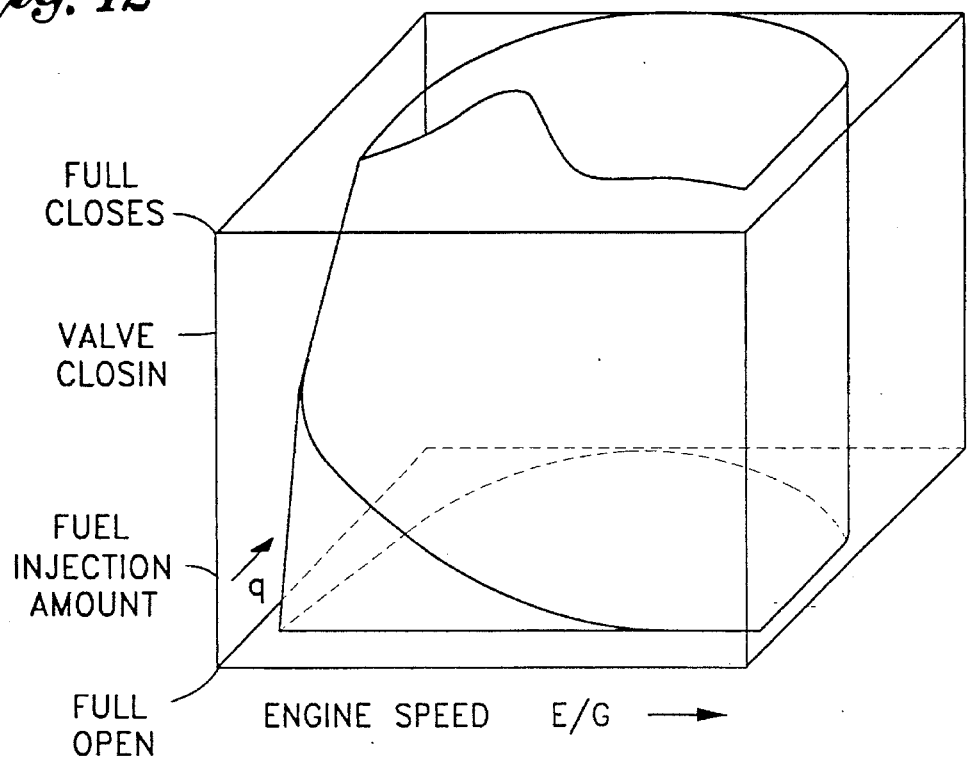
FIG. 12 is a three-dimensional map showing the control valve condition under all conditions in relation to engine speed and engine torque as determined by fuel injection amount q.
Figure 13:
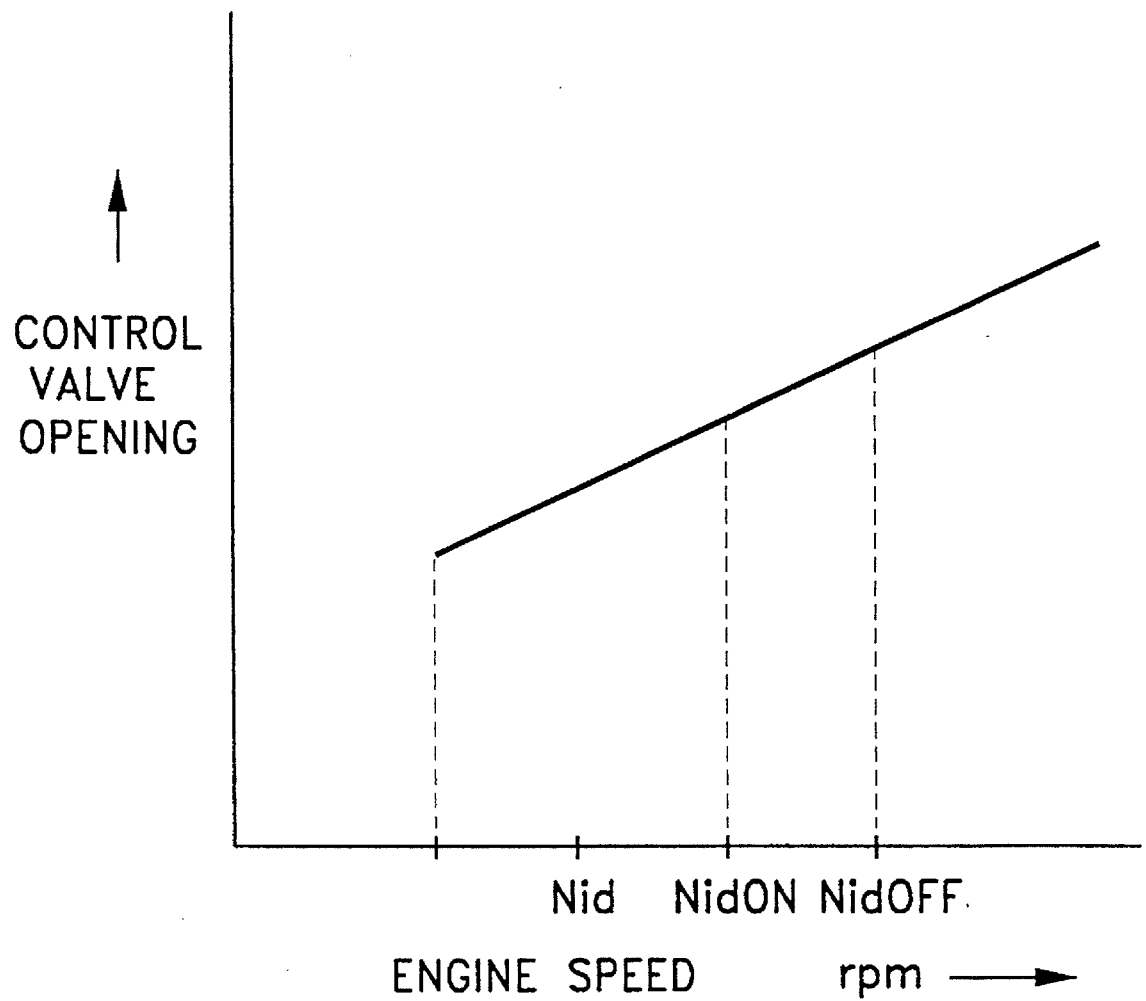
FIG. 13 is a graphical view showing the condition of the scavenge control valve at the range during engine starting and idle.

The operational control strategy for operating the scavenge control valve assembly 72 will now be described to reference to FIGS. 10–13. FIG. 10 shows the control routine while FIGS. 11–13 show the control strategy and mapping.

Referring first to FIG. 10, it will be seen that the operational mode is similar to that of the exhaust control valve 67 in that it includes a pre-starting mode, a starting mode, and idle mode and a travel mode. Again the program starts at the step S1 when the main switch is turned on to its accessory position. The program then moves to the step S2 so as to initiate the pre-start mode of operation. In this operation, the scavenge control valve 72 is moved to its completely closed position by actuating the stepper motor 78.

The initial determination of the position of the control valve shaft 77 is read and the stepper motor 78 is operated for a number of steps equal to those required to close the control valve 72. However, in accordance with a preferred control routine, several more drive steps are employed so as to insure that the valve is fully closed. This is sensed by determining when it is impossible to rotate the shaft 77 any further and when this occurs, the memory of the unit is changed if necessary so as to indicate a new fully closed position for the valve 72. In this way, the fully closed position can be determined and updated. It should be noted that the exhaust control valve has no positive stop as is inherent in the butterfly type control valve 76 of the scavenged control valve assembly 72 so this action is not performed with the exhaust control valve 67.

When it is determined that the scavenge control valve 72 has been fully closed, the program then moves to the step S3 so as to illuminate a pilot light and indicate to the operator that the pre-starting routine has been completed. The pilot light may be the same pilot light as employed for the exhaust control valve and if this is the case, then the pilot light is not illuminated until both valves are fully closed. Alternatively, a separate control light may be employed for each valve.

Rather than using a stepper motor, it would be possible to substitute a DC motor and in such a case then the condition when the DC motor stalled indicating the closed position of the scavenge control valve 72 could be read and the information in the ECU 71 updated to include that information.

Once the operator sees that the pilot light is illuminated he may move to the step S4 and to turn the main switch to its starting position. The program then moves to the step S5 so as to initiate the starting mode control of the scavenge control valve 72. In this condition, the scavenge control valve 72 is maintained in its fully closed position so as to provide maximum scavenging and to insure that the engine will start easily.

The program them moves to the step S6 to determine if the engine speed N is greater than or equal to a speed which is high enough above the cranking speed so as to insure that the engine is operating on its own. This is the speed $N_{st}$ as set forth previously. When the speed equals or exceeds the speed $N_{st}$ then at the step S7 the starter motor is switched off.

The program then moves into the idle control mode. The program begins to confirm that the operator control and running conditions indicate that the engine 21 is in idle and at the step S8 the actual engine speed N is compared with the idle on switch speed Nid-ON and if it is less than or equal to the speed the program continues. If not, it jumps ahead to the travel mode as shown in FIG. 10.

Assuming the engine speed is equal to or below the speed Nid-ON, the program then moves to the step S9 to read the accelerator position sensor 96 to confirm that the operator is still calling for idle operation. If he is not, the program jumps ahead.

If, however, at the steps S8 and S9 it has been determined that the engine is in the idle mode, then the program moves to the step S10 so as to initiate idle mode control. This control uses a two dimensional map as shown in FIGS. 11 and 13. FIG. 11 shows a normal torque control curve A and a maximum torque control curve B. The actual aperture for the position of the scavenge control valve 72 is read from the map of FIG. 13 but it is chosen so as to have a zero rate of smoke generation in the region under the torque curve A and increase as the torque curve approaches curve B where it reaches a maximum of twenty percent. In the operating range from curve A to B, the scavenge control valve is fully closed while in the range under curve A, aperture control is exercised.

When the engine speed is in the low to middle range, a broad range of aperture control is permitted while in the high RPM range the scavenge control valve 72 is maintained in a closed position regardless of the engine torque curve or fuel injection supply amount per cycle.

By opening the scavenge control valve 72 during the idling operation, it is possible to reduce pumping losses and improve fuel economy. It is also possible to improve the internal EGR ratio, lower the combustion temperature and reduce NOX emissions. Also, by reducing the amount of intake air through the opening of the scavenge control valve 72 it is possible to provide induction system silencing.

At the step S12 it is continued to determine if the engine is in the idle mode or has moved to the travel mode by determining if the engine speed N is equal to or greater than Nid-OFF. If the engine speed has increased, the program moves to the travel or running control mode at step S13. At the step S14 the control valve 72 is positioned in response to the read value from the map of FIG. 12. Under all conditions, of course, the smoke content is maintained below twenty percent by utilization of the scavenge control valve 72.

The shut off routine of steps S15 and S16 is the same as that with the exhaust control valve although there is no need for a cleaning operation of the scavenge control valve.

The foregoing description describes certain relatively steady state conditions except for the idle and starting conditions which can be considered to be somewhat in the nature of transient conditions. As has been previously noted, another condition wherein the control of the scavenging and exhaust can be utilized to improve engine performance is under engine braking conditions. With a diesel engine, as has been noted, the fuel is normally shut off under engine braking. When this is done, then large amounts of air are pumped through the exhaust system and this can diminish the catalyst temperature and reduce its deficiency.

In accordance with a further embodiment of the invention, when an engine braking mode is sensed, then certain control routines are established. This engine braking is determined when the engine speed as sensed by the engine speed sensor 94 is relatively high and the acceleration position sensor 96 indicates that the accelerator is not depressed. When this happens, in addition to cutting fuel supply, the scavenge control valve 72 is fully opened and the exhaust control valve 67 if fully closed. By opening the scavenge control valve 72, the scavenge pressure is reduced because the volume of the various crank chambers 36 is effectively increased. Thus, there is reduced intake air drawn into the combustion chambers so as to reduce the cooling effect in the exhaust system.

Also, by closing the exhaust control valve 67 the effective compression ratio is increased and the heat of compression will heat the air that is pumped through the exhaust. In addition, this heat maintains the temperature within the combustion chamber so that when fuel injection is resumed misfiring, white smoke and hydrocarbon generation will be reduced.

Figure 14:
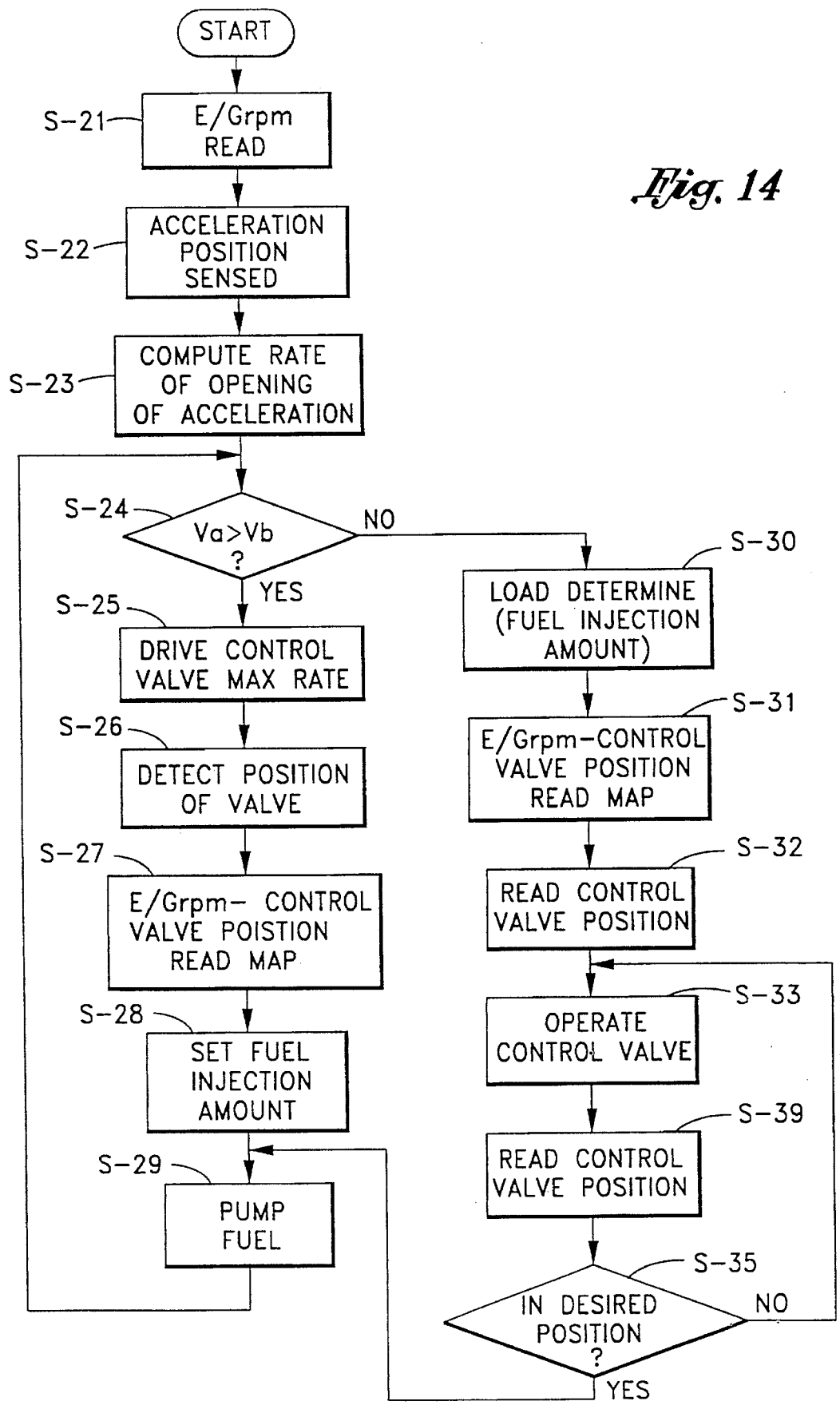
FIG. 14 is a graphical view showing the control routine upon acceleration conditions.

A further condition wherein the scavenge control valve 72 and exhaust control valve 67 can be utilized to improve performance is when there is rapid acceleration. The maps which are shown in FIGS. 9 and 12 are generated by steady state running conditions and do not apply during transient conditions. In addition, there is a time delay in the operation of the stepper motors 69 and 78 and hence the exhaust control valve 67 and scavenge control valve 72 may not be in the exact condition at a given point in time as indicated by their respective control maps. Because of this, black smoke generation might occur due an excessive fuel supply. FIG. 14 shows a control routine wherein the fuel supply is altered in response to the actual positions of the scavenge control valve 72 and exhaust control valve 67 rather than their desired positions, when these positions do not coincide.

This control routine will be described by reference to FIG. 14 and it is to be understood that the control routine of FIG. 14 can be employed to control either or both the exhaust control valve 67 and the scavenged control valve 72 and the fuel injection amount along with it. Also, it is to be understood that this control routine takes place simultaneously with the other control routines but is employed when the accelerator is opened at a rate more rapid than that in which the respective control valve will operate.

The program starts and moves to the step S21 to read the engine speed and then to the step S22 to determine the accelerator position. At the step 23 the accelerator position is compared with the predetermined accelerated accelerator position in a given time period so as to determine the rate of change of the accelerator position.

Once the rate of change is determined, it is determined at the step S24 whether the rate of change of the accelerator position $v_a$ is greater than the rate of change of the respective control valve $v_b$. Again, it is to be understood that this procedure is followed with both the exhaust control valve 67 and the scavenge control valve 72.

If the rate of change of the accelerator position is greater than the rate of change of the respective control valve at the step S24, the program moves to the step S25 so as to initiate operation of the respective control valve in the appropriate direction at its maximum operating speed. This will be opening of the exhaust control valve and closing of the scavenging control valve when the accelerator is being opened rapidly.

The initial position of the respective control valve is then read at the step S26 and the program moves to the step S24 to read from the appropriate map of either FIG. 9 or FIG. 12 the respective fuel injection amount determined by the then engine speed and control valve position. In other words, rather than controlling the position of the control valve in response to engine speed and fuel injection amount, the fuel injection amount is varied in response to the actual control valve position from the same so as to provide more accurate fuel control considering the time delay of moving of the respective control valve.

Once the map is read at the step S27, the program moves to the step S28 to set the actual fuel injection amount read from the respective map of FIGS. 9 or 12 and then the program moves to the step S29 so as to pump that actual amount of fuel.

If at the step S24 it is determined that the rate of change of position of the accelerator is not greater than the rate of permissible change of the control valve position, then the program moves to the step S30 to follow the normal control routine.

At the step S30 the actual load is read either as the fuel injection amount or from a torque sensor and at the step S30 the engine speed is read. From the engine speed and engine load, the program at this step reads the appropriate map of FIG. 9 or FIG. 12 so as to set the desired control valve position depending upon the engine speed and engine load. As has been previously noted, this control operates both the exhaust control valve 67 and the scavenged control valve 72. Once the position is read at the step S32, the program moves to the step S33 so as to operate the respective servomotor 69 or 78 and the position of the respective control valve 67 or 72 as monitored at the step S34.

At the step S35 it is determined if the control valve is in the appropriate position and if not the program repeats back to the step S33. If it is, however, the program then moves to the step S29 so as to inject the desired amount of fuel.

It should be readily apparent from the foregoing description that the described modes of operation provide very affective control and operation of a two-cycle, crankcase compression engine by controlling both compression ratio and scavenge control. Not only is this control adapted to provide good running under steady state conditions, it also provides good running under such transient or unusual situations as starting, idle, engine braking or rapid acceleration conditions. In conjunction with the description, the control has been described as being made by two parameters, engine speed and engine load, but it should be readily apparent to those skilled in the art that additional parameters or substitute parameters can be made. The system described, however, maintains basically good control with a minimum number of maps that need be programmed into the computer.

Of course, the foregoing description is that of a preferred embodiment of the invention but various changes and modifications may be made without departing from the spirit and scope of the invention, as defined by the appended claims.

I claim:

1. A two-cycle, crankcase compression internal combustion engine having a scavenging system for transferring a charge from a crankcase of said engine to a combustion chamber thereof, an exhaust system for discharge of exhaust products from said combustion chamber to the atmosphere, control means for controlling the flow through at least one of said systems, sensors for sensing at least two running parameters of said engine, and operating means for operating said control means in accordance with a first map in a normal steady state condition within at least a certain speed range and in accordance with another routine in response to another engine condition.

2. A two-cycle, crankcase compression internal combustion engine as in claim 1, wherein the engine is provided with a starter for starting the engine and wherein the other condition is the condition of starting the engine.

3. A two-cycle, crankcase compression internal combustion engine as in claim 2, wherein the control means comprises a exhaust control valve for controlling the flow through the exhaust system.

4. A two-cycle, crankcase compression internal combustion engine as in claim 3, wherein the exhaust control valve changes the effective compression ratio of the engine.

5. A two-cycle, crankcase compression internal combustion engine as in claim 4, wherein the exhaust control valve is moved to its closed position on starting and raises the compression ratio during starting.

6. A two-cycle, crankcase compression internal combustion engine as in claim 4, wherein the other routine effects at least one opening and closing of the exhaust control valve prior to the initiation of starting for cleaning the exhaust control valve.

7. A two-cycle, crankcase compression internal combustion engine as in claim 6, further including means for operating the exhaust control valve through a complete opening and closing cycle upon stopping of the engine for cleaning the exhaust control valve.

8. A two-cycle, crankcase compression internal combustion engine as in claim 7, wherein the exhaust control valve is moved to its closed position on starting and raises the compression ratio during starting.

9. A two-cycle, crankcase compression internal combustion engine as in claim 2, wherein the control means comprises a scavenge control valve for controlling the amount of scavenging air flow.

10. A two-cycle, crankcase compression internal combustion engine as in claim 9, wherein the scavenge control valve controls the amount of scavenging by controlling the pressure in the crankcase chamber.

11. A two-cycle, crankcase compression internal combustion engine as in claim 10, wherein the crankcase chamber pressure is controlled by communicating the crankcase chamber with the chamber of another crankcase associated with a combustion chamber that does not fire at the same time.

12. A two-cycle, crankcase compression internal combustion engine as in claim 9, wherein the other routine effects complete closure of the scavenge control valve for maximizing the scavenging during starting.

13. A two-cycle, crankcase compression internal combustion engine as in claim 12, wherein the other condition further includes initial engine idle and wherein the scavenge control valve is operated in response to a second two dimensional map during idle conditions.

14. A two-cycle, crankcase compression internal combustion engine as in claim 13, wherein the control means further comprises an exhaust control valve for controlling the flow through the exhaust system.

15. A two-cycle, crankcase compression internal combustion engine as in claim 14, wherein the exhaust control valve changes the effective compression ratio of the engine.

16. A two-cycle, crankcase compression internal combustion engine as in claim 15, wherein the exhaust control valve is moved to its closed position on starting and raises the compression ratio during starting.

17. A two-cycle, crankcase compression internal combustion engine as in claim 1, wherein the other engine condition comprises an idle condition.

18. A two-cycle, crankcase compression internal combustion engine as in claim 17, wherein the control means comprises an exhaust control valve for controlling the flow through the exhaust system.

19. A two-cycle, crankcase compression internal combustion engine as in claim 18, wherein the exhaust control valve changes the effective compression ratio of the engine.

20. A two-cycle, crankcase compression internal combustion engine as in claim 19, wherein the exhaust control valve is maintained in a closed position during idle running.

21. A two-cycle, crankcase compression internal combustion engine as in claim 17, wherein the control means comprises a scavenge control valve for controlling the amount of scavenging air flow.

22. A two-cycle, crankcase compression internal combustion engine as in claim 21, wherein the scavenge control valve controls the amount of scavenging by controlling the pressure in the crankcase chamber.

23. A two-cycle, crankcase compression internal combustion engine as in claim 22, wherein the crankcase chamber pressure is controlled by communicating the crankcase chamber with the chamber of another crankcase associated with a combustion chamber that does not fire at the same time.

24. A two-cycle, crankcase compression internal combustion engine as in claim 21, wherein the other routine effects opening of the scavenge control valve for controlling the scavenging during idle in response to a second, two dimensional map.

25. A two-cycle, crankcase compression internal combustion engine as in claim 24, wherein the control means further comprises an exhaust control valve for controlling the flow through the exhaust system.

26. A two-cycle, crankcase compression internal combustion engine as in claim 25, wherein the exhaust control valve changes the effective compression ratio of the engine.

27. A two-cycle, crankcase compression internal combustion engine as in claim 26, wherein the exhaust control valve is maintained in a closed position during idle running.

28. A two-cycle, crankcase compression internal combustion engine as in claim 1, further including an accelerator for controlling the speed and output of the engine and wherein the other condition comprises opening of the accelerator at a rate faster than the control means is capable of reacting.

29. A two-cycle, crankcase compression internal combustion engine as in claim 28, wherein the control means comprises exhaust control valve for controlling the flow through the exhaust system.

30. A two-cycle, crankcase compression internal combustion engine as in claim 29, wherein the exhaust control valve changes the effective compression ratio of the engine.

31. A two-cycle, crankcase compression internal combustion engine as in claim 30, where the exhaust control valve is moved at a maximum rate to its opened position in response to the rapid acceleration.

32. A two-cycle, crankcase compression internal combustion engine as in claim 31, further including means for supplying fuel to the engine for its operation in response to the two running parameters of the engine and means for controlling the supply of fuel during the rapid acceleration condition in response to the actual engine speed and the actual position of the exhaust control valve from the first map.

33. A two-cycle, crankcase compression internal combustion engine as in claim 28, wherein the control means comprises a scavenge control valve for controlling the amount of scavenging air flow.

34. A two-cycle, crankcase compression internal combustion engine as in claim 33, wherein the scavenge control valve controls the amount scavenging by controlling the pressure in the crankcase chamber.

35. A two-cycle, crankcase compression internal combustion engine as in claim 34, wherein the crankcase chamber pressure is controlled by communicating the crankcase chamber with the chamber of another crankcase associated with a combustion chamber that does not fire at the same time.

36. A two-cycle, crankcase compression internal combustion engine as in claim 33, where the scavenge control valve is moved at a maximum rate to its closed position in response to the rapid acceleration.

37. A two-cycle, crankcase compression internal combustion engine as in claim 36, further including means for supplying fuel to the engine for its operation in response to the two running parameters of the engine and means for controlling the supply of fuel during the rapid acceleration condition in response to the actual engine speed and the actual position of the scavenge control valve from the first map.

38. A two-cycle, crankcase compression internal combustion engine as in claim 37, wherein the control means further comprises an exhaust control valve for controlling the flow through the exhaust system.

39. A two-cycle, crankcase compression internal combustion engine as in claim 38, wherein the exhaust control valve changes the effective compression ratio of the engine.

40. A two-cycle, crankcase compression internal combustion engine as in claim 39, where the exhaust control valve is moved at a maximum rate to its opened position in response to the rapid acceleration.

41. A two-cycle, crankcase compression internal combustion engine as in claim 40, wherein the means for controlling the supply of fuel during the rapid acceleration condition in response to the actual engine speed and the actual position of the exhaust control valve from the first map.

42. A two-cycle, crankcase compression internal combustion engine as in claim 1, wherein the other engine condition comprises rapid deceleration of the engine to effect engine braking.

43. A two-cycle, crankcase compression internal combustion engine as in claim 42, further including means for supplying fuel to the engine for its operation and means for discontinuing the supply of fuel in response to engine braking.

44. A two-cycle, crankcase compression internal combustion engine as in claim 43, wherein the control means comprises an exhaust control valve for controlling the flow through the exhaust system.

45. A two-cycle, crankcase compression internal combustion engine as in claim 44, wherein the exhaust control valve changes the effective compression ratio of the engine.

46. A two-cycle, crankcase compression internal combustion engine as in claim 45, wherein the exhaust control valve is moved to elevate the compression ratio in response to deceleration for heating the charge delivered to the exhaust of the engine.

47. A two-cycle, crankcase compression internal combustion engine as in claim 43, wherein the control means comprises a scavenge control valve for controlling the amount of scavenging air flow.

48. A two-cycle, crankcase compression internal combustion engine as in claim 47, wherein the scavenge control valve controls the amount of scavenging by controlling the pressure in the crankcase chamber.

49. A two-cycle, crankcase compression internal combustion engine as in claim 48, wherein the crankcase chamber pressure is controlled by communicating the crankcase chamber with the chamber of another crankcase associated with a combustion chamber that does not fire at the same time.

50. A two-cycle, crankcase compression internal combustion engine as in claim 49, wherein the scavenge control valve is closed on rapid deceleration for reducing the amount of air flow.

51. A two-cycle, crankcase compression internal combustion engine as in claim 50, wherein the control means further comprises an exhaust control valve for controlling the flow through the exhaust system.

52. A two-cycle, crankcase compression internal combustion engine as in claim 51, wherein the exhaust control valve changes the effective compression ratio of the engine.

53. A two-cycle, crankcase compression internal combustion engine as in claim 52, wherein the exhaust control valve is moved to elevate the compression ratio in response to deceleration for heating the charge delivered to the exhaust of the engine.

54. A two-cycle, crankcase compression internal combustion engine as in claim 1, wherein the engine operates on a diesel cycle and further including fuel injector means for injecting fuel into the combustion chamber, the amount of fuel injected also being controlled by the two running parameters of the engine, those being engine speed and engine load.

55. A two-cycle, crankcase compression internal combustion engine as in claim 54, wherein the engine is provided with a starter for starting the engine and wherein the other condition is the condition of starting the engine.

56. A two-cycle, crankcase compression internal combustion engine as in claim 55, wherein the control means comprises an exhaust control valve for controlling the flow through the exhaust system.

57. A two-cycle, crankcase compression internal combustion engine as in claim 56, wherein the exhaust control valve changes the effective compression ratio of the engine.

58. A two-cycle, crankcase compression internal combustion engine as in claim 57, wherein the exhaust control valve is moved to its closed position on starting and raises the compression ratio during starting.

59. A two-cycle, crankcase compression internal combustion engine as in claim 57, wherein the other routine effects at least one opening and closing of the exhaust control valve prior to the initiation of starting for cleaning the exhaust control valve.

60. A two-cycle, crankcase compression internal combustion engine as in claim 59, further including means for operating the exhaust control valve through a complete opening and closing cycle upon stopping of the engine for cleaning the exhaust control valve.

61. A two-cycle, crankcase compression internal combustion engine as in claim 60, wherein the exhaust control valve is moved to its closed position on starting and raises the compression ratio during starting.

62. A two-cycle, crankcase compression internal combustion engine as in claim 54, wherein the control means comprises a scavenge control valve for controlling the amount of scavenging air flow.

63. A two-cycle, crankcase compression internal combustion engine as in claim 62, wherein the scavenge control valve controls the amount of scavenging by controlling the pressure in the crankcase chamber.

64. A two-cycle, crankcase compression internal combustion engine as in claim 63, wherein the crankcase chamber pressure is controlled by communicating the crankcase chamber with the chamber of another crankcase associated with a combustion chamber that does not fire at the same time.

65. A two-cycle, crankcase compression internal combustion engine as in claim 62, wherein the other routine effects complete closure of the scavenge control valve for maximizing the scavenging during starting.

66. A two-cycle, crankcase compression internal combustion engine as in claim 65, wherein the other condition further includes initial engine idle and wherein the scavenge control valve is operated in response to a second map during idle conditions.

67. A two-cycle, crankcase compression internal combustion engine as in claim 66, wherein the control means further comprises an exhaust control valve for controlling the flow through the exhaust system.

68. A two-cycle, crankcase compression internal combustion engine as in claim 67, wherein the exhaust control valve changes the effective compression ratio of the engine.

69. A two-cycle, crankcase compression internal combustion engine as in claim 68, wherein the exhaust control valve is moved to its closed position on starting and raises the compression ratio during starting.

70. A two-cycle, crankcase compression internal combustion engine as in claim 54, wherein the other engine condition comprises an idle condition.

71. A two-cycle, crankcase compression internal combustion engine as in claim 70, wherein the control means comprises an exhaust control valve for controlling the flow through the exhaust system.

72. A two-cycle, crankcase compression internal combustion engine as in claim 71, wherein the exhaust control valve changes the effective compression ratio of the engine.

73. A two-cycle, crankcase compression internal combustion engine as in claim 72, wherein the exhaust control valve is maintained in a closed position during idle running.

74. A two-cycle, crankcase compression internal combustion engine as in claim 70, wherein the control means comprises a scavenge control valve for controlling the amount of scavenging air flow.

75. A two-cycle, crankcase compression internal combustion engine as in claim 74, wherein the scavenge control valve controls the amount of scavenging by controlling the pressure in the crankcase chamber.

76. A two-cycle, crankcase compression internal combustion engine as in claim 75, wherein the crankcase chamber pressure is controlled by communicating the crankcase chamber with the chamber of another crankcase associated with a combustion chamber that does not fire at the same time.

77. A two-cycle, crankcase compression internal combustion engine as in claim 74, wherein the other routine effects opening of the scavenge control valve for controlling the scavenging during idle in response to a second, two dimensional map.

78. A two-cycle, crankcase compression internal combustion engine as in claim 77, wherein the control means further comprises an exhaust control valve for controlling the flow through the exhaust system.

79. A two-cycle, crankcase compression internal combustion engine as in claim 78, wherein the exhaust control valve changes the effective compression ratio of the engine.

80. A two-cycle, crankcase compression internal combustion engine as in claim 79, wherein the exhaust control valve is maintained in a closed position during idle running.

81. A two-cycle, crankcase compression internal combustion engine as in claim 54, further including an accelerator for controlling the speed and output of the engine and wherein the other condition comprises opening of the accelerator at a rate faster than the control means is capable of reacting.

82. A two-cycle, crankcase compression internal combustion engine as in claim 81, wherein the control means comprises an exhaust control valve for controlling the flow through the exhaust system.

83. A two-cycle, crankcase compression internal combustion engine as in claim 82, wherein the exhaust control valve changes the effective compression ratio of the engine.

84. A two-cycle, crankcase compression internal combustion engine as in claim 83, where the exhaust control valve is moved at a maximum rate to its opened position in response to the rapid acceleration.

85. A two-cycle, crankcase compression internal combustion engine as in claim 84, further including means controlling the supply of fuel by the fuel injector during the rapid acceleration condition in response to the actual engine speed and the actual position of the exhaust control valve from the first map.

86. A two-cycle, crankcase compression internal combustion engine as in claim 81, wherein the control means comprises a scavenge control valve for controlling the amount of scavenging air flow.

87. A two-cycle, crankcase compression internal combustion engine as in claim 86, wherein the scavenge control valve controls the amount of scavenging by controlling the pressure in the crankcase chamber.

88. A two-cycle, crankcase compression internal combustion engine as in claim 87, wherein the crankcase chamber pressure is controlled by communicating the crankcase chamber with the chamber of another crankcase associated with a combustion chamber that does not fire at the same time.

89. A two-cycle, crankcase compression internal combustion engine as in claim 86, where the scavenge control valve is moved at a maximum rate to its opened position in response to the rapid acceleration.

90. A two-cycle, crankcase compression internal combustion engine as in claim 89, further including controlling the supply of fuel by the fuel injector during the rapid acceleration condition in response to the actual engine speed and the actual position of the scavenge control valve from the first map.

91. A two-cycle, crankcase compression internal combustion engine as in claim 90, wherein the control means further comprises an exhaust control valve for controlling the flow through the exhaust system.

92. A two-cycle, crankcase compression internal combustion engine as in claim 91, wherein the exhaust control valve changes the effective compression ratio of the engine.

93. A two-cycle, crankcase compression internal combustion engine as in claim 92, where the exhaust control valve is moved at a maximum rate to its opened position in response to the rapid acceleration.

94. A two-cycle, crankcase compression internal combustion engine as in claim 93, further including controlling the supply of fuel by the fuel injector during the rapid acceleration condition in response to the actual engine speed and the actual position of the exhaust control valve from the first map.

95. A two-cycle, crankcase compression internal combustion engine as in claim 54, wherein the other engine condition comprises rapid deceleration of the engine to effect engine braking.

96. A two-cycle, crankcase compression internal combustion engine as in claim 95, further including means for discontinuing the supply of fuel by the fuel injector in response to engine braking.

97. A two-cycle, crankcase compression internal combustion engine as in claim 96, wherein the control means comprises an exhaust control valve for controlling the flow through the exhaust system.

98. A two-cycle, crankcase compression internal combustion engine as in claim 97, wherein the exhaust control valve changes the effective compression ratio of the engine.

99. A two-cycle, crankcase compression internal combustion engine as in claim 98, wherein the exhaust control valve is moved to elevate the compression ratio in response to deceleration for heating the charge delivered to the exhaust of the engine.

100. A two-cycle, crankcase compression internal combustion engine as in claim 96, wherein the control means comprises a scavenge control valve for controlling the amount of scavenging air flow.

101. A two-cycle, crankcase compression internal combustion engine as in claim 100, wherein the scavenge control valve controls the amount of scavenging by controlling the pressure in the crankcase chamber.

102. A two-cycle, crankcase compression internal combustion engine as in claim 101, wherein the crankcase chamber pressure is controlled by communicating the crankcase chamber with the chamber of another crankcase associated with a combustion chamber that does not fire at the same time.

103. A two-cycle, crankcase compression internal combustion engine as in claim 102, wherein the scavenge control valve is closed on rapid deceleration for reducing the amount of air flow.

104. A two-cycle, crankcase compression internal combustion engine as in claim 103, wherein the control means further comprises an exhaust control valve for controlling the flow through the exhaust system.

105. A two-cycle, crankcase compression internal combustion engine as in claim 104, wherein the exhaust control valve changes the effective compression ratio of the engine.

106. A two-cycle, crankcase compression internal combustion engine as in claim 105, wherein the exhaust control valve is moved to elevate the compression ratio in response to deceleration for heating the charge delivered to the exhaust of the engine.

* * * * *